US 9,583,814 B2

(12) United States Patent
Denis et al.

(10) Patent No.: US 9,583,814 B2
(45) Date of Patent: Feb. 28, 2017

(54) SYSTEM AND METHOD FOR AN ANTENNA ON A CABLE

(71) Applicant: ILLINOIS TOOL WORKS INC., Glenview, IL (US)

(72) Inventors: Marc L. Denis, Lena, WI (US); Michael Anthony Gill, Black Creek, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 150 days.

(21) Appl. No.: 14/480,152

(22) Filed: Sep. 8, 2014

(65) Prior Publication Data

US 2016/0072175 A1    Mar. 10, 2016

(51) Int. Cl.

| H01Q 1/22 | (2006.01) |
| H01Q 1/38 | (2006.01) |
| H01Q 1/46 | (2006.01) |
| H04B 1/38 | (2015.01) |
| B23K 9/095 | (2006.01) |
| H04B 1/3827 | (2015.01) |

(52) U.S. Cl.
CPC ............. *H01Q 1/22* (2013.01); *B23K 9/095* (2013.01); *H01Q 1/46* (2013.01); *H04B 1/3827* (2013.01); *H01Q 1/38* (2013.01)

(58) Field of Classification Search
CPC .......... B23K 9/095; H01B 9/001; H01Q 1/22; H01Q 1/38; H01Q 1/46; H04B 1/3827
See application file for complete search history.

(56) References Cited

U.S. PATENT DOCUMENTS

| 5,208,602 | A | 5/1993 | Monser | |
| 6,304,226 | B1 | 10/2001 | Brown | |
| 8,766,875 | B2 | 7/2014 | Williams | |
| 2002/0122006 | A1 | 9/2002 | Crawford | |
| 2002/0168937 | A1* | 11/2002 | Clark | B23K 9/1062 455/41.1 |
| 2007/0080149 | A1 | 4/2007 | Albrecht | |
| 2008/0102813 | A1 | 5/2008 | Chari | |
| 2008/0116186 | A1* | 5/2008 | Luck | B23K 9/1087 219/132 |
| 2010/0108654 | A1 | 5/2010 | Ulrich | |

(Continued)

FOREIGN PATENT DOCUMENTS

| CN | 201708353 | 1/2011 |
| EP | 2629363 | 8/2013 |

(Continued)

OTHER PUBLICATIONS

International Search Report for PCT application No. PCT/US2015/03992, dated Oct. 6, 2015, 11 pgs.

(Continued)

*Primary Examiner* — Lewis West
(74) *Attorney, Agent, or Firm* — Fletcher Yoder P.C.

(57) ABSTRACT

A system includes an enclosure having a first radio module disposed therein, a first cable coupled to the enclosure, and a first antenna electrically coupled to the first radio module and mounted to the first cable at a first location along the first cable outside the enclosure. The first radio module is configured to communicate along a first wireless communications channel via the first antenna.

20 Claims, 3 Drawing Sheets

(56) References Cited

U.S. PATENT DOCUMENTS

| | | | |
|---|---|---|---|
| 2010/0176106 A1* | 7/2010 | Christensen | B23K 37/0264 |
| | | | 219/137 R |
| 2011/0006953 A1 | 1/2011 | Chiang | |
| 2012/0110091 A1* | 5/2012 | Chantry | B23K 9/1006 |
| | | | 709/206 |
| 2012/0268343 A1 | 10/2012 | Yanagi | |
| 2013/0249749 A1* | 9/2013 | Nitta | B60R 16/0207 |
| | | | 343/720 |
| 2013/0319988 A1* | 12/2013 | Beistle | B23K 9/24 |
| | | | 219/137 R |
| 2014/0048522 A1 | 2/2014 | Dina | |
| 2014/0049382 A1* | 2/2014 | Dina | B23K 9/1087 |
| | | | 340/12.5 |
| 2014/0051358 A1* | 2/2014 | Dina | H04L 12/6418 |
| | | | 455/41.2 |
| 2014/0051359 A1 | 2/2014 | Dina | |
| 2014/0052832 A1* | 2/2014 | Dina | H04L 41/00 |
| | | | 709/221 |
| 2014/0263247 A1* | 9/2014 | Hillen | G07C 9/00111 |
| | | | 219/137 R |
| 2015/0114942 A1* | 4/2015 | Denis | B23K 9/1087 |
| | | | 219/132 |

FOREIGN PATENT DOCUMENTS

| | | |
|---|---|---|
| GB | 2471753 | 1/2011 |
| JP | H10208003 | 8/1998 |
| WO | 9512223 | 5/1995 |
| WO | 2014150118 | 9/2014 |

OTHER PUBLICATIONS

International Search Report for PCT application No. PCT/US2015/040390, dated Oct. 6, 2015, 11 pgs.

Yang, Fan and Yahay Rahmat-Samii; "Electromagnetic Band Gap Structures in Antenna Engineering," Cambridge University Press, 2009, pp. 108-109.

* cited by examiner

SYSTEM AND METHOD FOR AN ANTENNA ON A CABLE

BACKGROUND

The invention relates generally to wireless communications and, more particularly, to systems and methods for wireless communications in a welding system.

Welding is a process that has increasingly become utilized in various industries and applications. Such processes may be automated in certain contexts, although a large number of applications continue to exist for manual welding operations. In both cases, such welding operations rely on communication between a variety of types of equipment (e.g., devices) to ensure that welding operations are performed properly.

Certain welding systems may include devices that communicate with each other using wired communication, while other welding systems may include devices that communicate with each other using wireless communication. A wireless communication system may utilize a radio module coupled to an antenna to receive or transmit electromagnetic waves for wireless communication. Regulations may specify various characteristics of wireless communication systems to reduce electromagnetic interference among multiple wireless communication systems. However, regulations may specify minimum distances between antennas of separate wireless communication systems, thereby affecting the geometry of enclosures for the wireless communication systems. Additionally, some antennas mounted to enclosures may be relatively bulky or obtrusive, and antennas mounted to enclosures may restrict the effective range or directionality of wireless communication.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes an enclosure having a first radio module disposed therein, a first cable coupled to the enclosure, and a first antenna electrically coupled to the first radio module and mounted to the first cable at a first location along the first cable outside the enclosure. The first radio module is configured to communicate along a first wireless communications channel via the first antenna.

In another embodiment, a welding system includes a first antenna and a first communication line electrically coupled to the first antenna. The first antenna is configured to be mounted to a first cable that interfaces with an enclosure of the welding system, and the first antenna is configured to communicate along a first wireless communications channel. The first communication line is configured to electrically couple the first antenna to a first radio module disposed within the enclosure.

In another embodiment, a welding system includes a weld cable configured to provide a weld power to a torch, an antenna mounted to the weld cable, and a communication line having a first end and a second end. The weld cable includes a first terminal configured to interface with an enclosure. The antenna is configured to receive or transmit a radio signal. The first end is configured to electrically couple with the antenna, and the second end is configured to electrically couple with a radio module within the enclosure.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
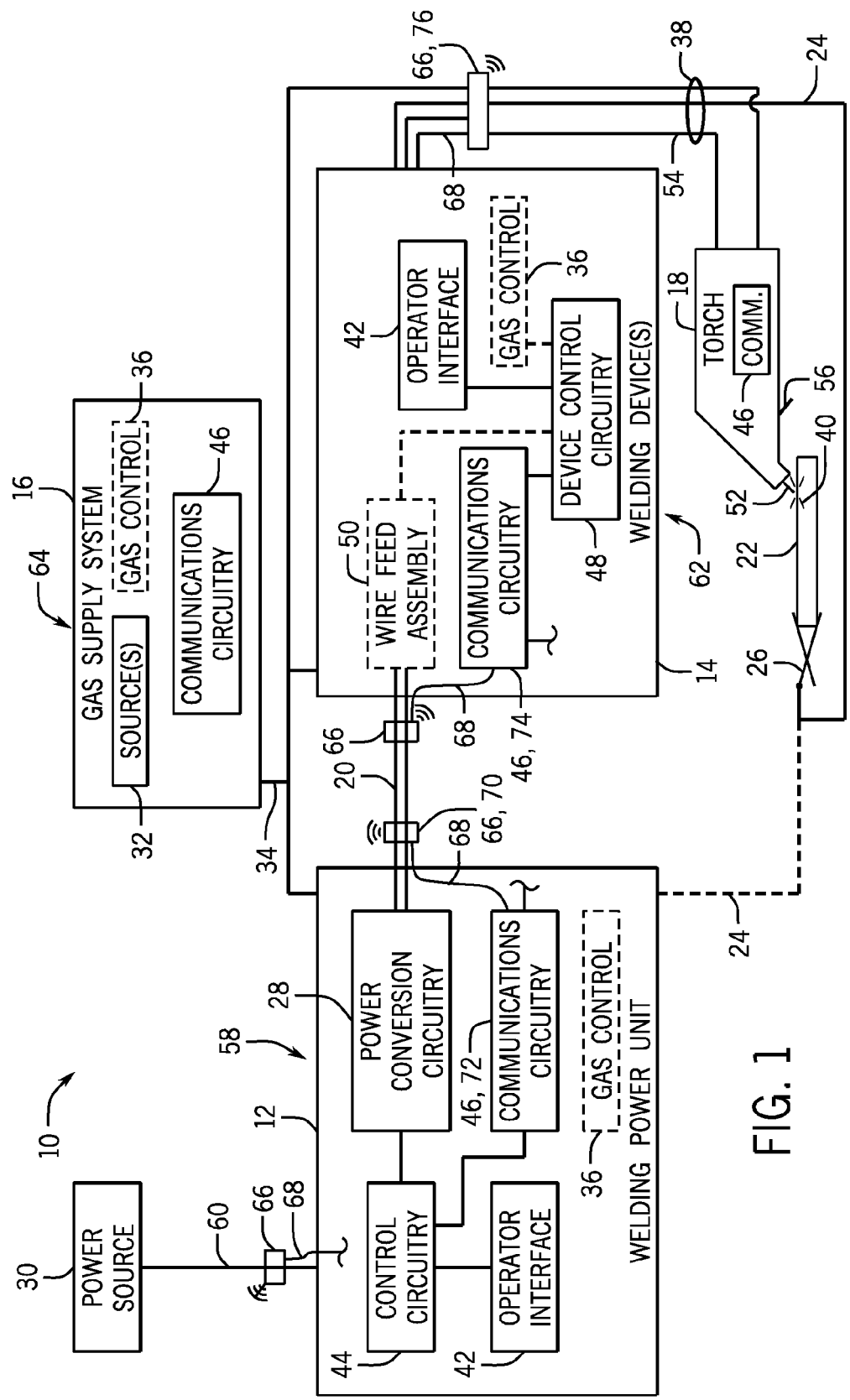
FIG. 1 illustrates an embodiment of a welding system with antennas about conduits of the welding system.

Turning to the figures, FIG. 1 illustrates an embodiment of a welding system 10 (e.g., a gas metal arc welding (GMAW) system) where a welding power unit 12 and one or more welding devices 14 may be utilized together in accordance with aspects of the present disclosure. It should be appreciated that, while the present discussion may focus specifically on the GMAW system 10 illustrated in FIG. 1, the presently disclosed methods may be used in systems using any arc welding process (e.g., FCAW, FCAW-G, GTAW (i.e., TIG), SAW, SMAW, or similar arc welding process). Furthermore, although the present application specifically relates to communications among welding devices, the communication methods provided herein may be applied to any two devices utilized together.

As illustrated, the welding system 10 includes the welding power unit 12, the welding device 14 (e.g., a welding wire feeder, remote device, pendant, remote control, welding sensor), a gas supply system 16, and a welding torch 18. The welding power unit 12 generally supplies welding power (e.g., voltage, current, etc.) for the welding system 10, and the welding power unit 12 may be coupled to the welding device 14 via a cable bundle 20 as well as coupled to a workpiece 22 using a work cable 24 having a clamp 26. The work cable 24 may be integrated with or separate from the cable bundle 20.

In some embodiments, the cable bundle 20 includes a wired communication line between the welding power unit 12 and the welding device 14. For example, the welding power unit 12 may communicate with the welding device 14 via power line communication where data is provided (e.g., transmitted, sent, transferred, delivered) over welding power (e.g., over the same physical electrical conductor). As will be appreciated, the welding power unit 12 may communicate (e.g., receive and/or transmit signals) with the welding device 14 using any suitable wired or wireless protocol (e.g., RS-232, RS-485, Ethernet, a proprietary communication protocol). In certain embodiments, the welding power unit 12 and the welding device 14 may communicate using a wired communication line that links the welding power unit 12 and the welding device 14 via a network (e.g., Internet, intranet). For example, both the welding power unit 12 and the welding device 14 may be wired to the Internet using an Ethernet cable. Accordingly, the welding power unit 12 may communicate with the welding device 14 via the Internet. In some embodiments, the welding power unit 12 and the welding device 14 may communicate (e.g., either directly, or indirectly via a network) using a wireless communication channel (e.g., Wi-Fi, Bluetooth, Zigbee, cellular). For example, a cellular wireless communications channel may communicate via standards including, but not limited to, the code division multiple access (CDMA) standard, the Global System for Mobile Communications (GSM) standard, or any combination thereof.

The welding power unit 12 may include power conversion circuitry 28 that receives input power from a power source 30 (e.g., an AC power grid, an engine/generator set, or a combination thereof), conditions the input power, and provides DC or AC output power via the cable bundle 20. As such, the welding power unit 12 may power the welding device 14 that, in turn, powers the welding torch 18, in accordance with demands of the welding system 10. The work cable 24 terminating in the clamp 26 couples the welding power unit 12 to the workpiece 22 to close the circuit between the welding power unit 12, the workpiece 22, and the welding torch 18. The power conversion circuitry 28 may include circuit elements (e.g., transformers, rectifiers, switches, boost converters, buck converters, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10.

The illustrated welding system 10 includes the gas supply system 16 that supplies a shielding gas or shielding gas mixtures from one or more shielding gas sources 32 to the welding torch 18. The gas supply system 16 may be directly coupled to the welding power unit 12, the welding device 14, and/or the torch 18 via a gas line 34. A gas control system 36 having one or more valves respectively coupled to the one or more shielding gas sources 32 may regulate the flow of gas from the gas supply system 16 to the welding torch 18. The gas control system 36 may be integrated with the welding power unit 12, the welding device 14, or the gas supply system 16, or any combination thereof.

A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit relative to the filler metal and/or base metal, and so forth). In general, the shielding gas is provided at the time of welding, and may be turned on immediately preceding the weld and/or for a short time following the weld. In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via gas line 34) may include Ar, $Ar/CO_2$ mixtures, $Ar/CO_2/O_2$ mixtures, Ar/He mixtures, and so forth.

In the illustrated embodiment, the welding device 14 is coupled to the welding torch 18 via a cable bundle 38 in order to supply consumables (e.g., shielding gas, welding wire) and welding power to the welding torch 18 during operation of the welding system 10. In another embodiment, the cable bundle 38 may only provide welding power to the welding torch 18. During operation, the welding torch 18 may be brought near the workpiece 22 so that an arc 40 may be formed between the consumable welding electrode (i.e., the welding wire exiting a contact tip of the welding torch 18) and the workpiece 22.

The welding system 10 is designed to allow for data settings (e.g., weld parameters, weld process, and so forth) to be selected or input by the operator, particularly via an operator interface 42 provided on the welding power unit 12. The operator interface will typically be incorporated into a front faceplate of the welding power unit 12, and may allow for selection of settings. The selected settings are communicated to control circuitry 44 within the welding power unit 12. The control circuitry 44, described in greater detail below, operates to control generation of welding power output from the welding power unit 12 that is applied to the welding wire by the power conversion circuitry 28 for carrying out the desired welding operation. The control circuitry 44 may control the power conversion circuitry 28 based at least in part on data settings received via the operator interface 42, data settings received via communications circuitry 46 of the welding power unit 12, or any combination thereof. As discussed in detail below, the data settings received via the communications circuitry 46 may be received via a wired and/or wireless connection with one or more networked devices, such as another welding power unit 12, welding device 14, gas supply system 16, torch 18, a sensor, a workstation, a server, and so forth, or any combination thereof. As discussed in detail below, the welding system 10 may include multiple communications circuits 46 within the welding power unit 12, the one or more welding devices 14, the gas supply system 16, or the torch 18, or any combination thereof. The communications circuits 46 may be communicatively coupled (i.e., paired, networked) with one another over one or more of a variety of communication channels including, but not limited to, power line communication, RS-232, RS-485, Ethernet, Wi-Fi, Zigbee, Bluetooth, cellular, or any combination thereof. In some embodiments, the communications circuits 46 and operator interfaces 42 may enable data settings (e.g., wire feed speeds, weld processes, currents, voltages, arc lengths, power levels) to be set on one or more components of the welding system 10, such as the welding power unit 12, the one or more welding devices 14, the gas supply system 16, the torch 18, or any combination thereof. Additionally, or in the alternative, data settings stored in a memory and/or a database may be transmitted to the communications circuitry 46 from a computer, a workstation, a server, or any combination thereof.

Device control circuitry 48 of the one or more welding devices 14 may control various components of the respective welding device 14. In some embodiments, the device control circuitry 48 may receive input from an operator interface 42 of the welding device 14 and/or input from the communications circuitry 46 of the welding device 14. The one or more welding devices 14 may include a wire feeder having a wire feed assembly 50 controlled by the device control circuitry 48. The wire feed assembly 50 may include, but is not limited to, a motor, drive wheels, a spool, power conversion circuitry, or any combination thereof. The device control circuitry 48 may control the feed of welding wire from the spool to the torch 18 in accordance with input received via the operator interface 42 or the communications circuitry 46 for a desired welding application. In some embodiments, the operator interface 42 of the welding device may enable the operator to select one or more weld parameters, such as wire feed speed, the type of wire utilized, the current, the voltage, the power settings, and so forth.

During a welding application, power from the welding power unit 12 is applied to an electrode 52 (e.g., wire), typically by means of a weld cable 54 of the cable bundle 38 coupled to the torch 18. Similarly, shielding gas via the gas line 34 may be fed through the cable bundle 38 to the torch 18. In some embodiments, the wire 42 is advanced through the cable bundle 38 towards the torch 18 during welding operations. When a trigger switch 56 on the torch 18 is actuated, communications circuitry 46 in the torch 18 may be configured to provide a signal (e.g., wired or wireless) to the welding power unit 12, the welding device 14, or the gas supply system 16, or any combination thereof, thereby enabling the welding process to be started and stopped by the operator. That is, upon depression of the trigger switch 56, gas flow is begun, a wire may be advanced, and power is applied to the weld cable 54 and through the torch 16 for the welding application. In some embodiments, the communications circuitry 46 in the torch 18 may facilitate communication between the torch 18 and other components of the welding system 10 during the welding application.

Components of the welding power unit 12, the welding device 14, and the gas supply system 16 may be disposed within respective enclosures. For example, the control circuitry 44, power conversion circuitry 28, communications circuitry 46, and the gas control 36 of the welding power unit 12 are arranged within a first enclosure 58. The operator interface 42 may be integrated with and/or mounted to the first enclosure 58. In a similar manner, a second enclosure 62 may at least partially enclose components of the welding device 14, such as the gas control 36, the operator interface 42, the communications circuitry 46, the welding device control circuitry 48, and the wire feed assembly 50. A third enclosure 64 may at least partially enclose components of the gas supply system 16, such as the shielding gas sources 32, the gas control 36, and communications circuitry 46. As discussed in detail below, the components within the respective enclosures may receive and/or transmit signals through conduits or cables that are coupled to the enclosures via terminals, conduits or cables that extend through the enclosures, or any combination thereof. For example, an input power cable 60 coupled to the power source 30 may extend through the first enclosure 58, and conduits (e.g., work cable 24, weld cable 54) of the cable bundle 20 may couple with terminals on the first enclosure 58 and the second enclosure 62. Additionally, or in the alternative, the conduits coupled to and/or through the enclosures 58, 62, 64 may include, but are not limited to, the cable bundles 20, 38, the input power cable 60, the weld cable 54, the work cable 24, the gas supply line 34, a wired communication line, or any combination thereof.

One or more of the communications circuitry 46 components within the first, second, and/or third enclosures 58, 62, 64 may communicate (e.g., receive and/or transmit) wireless signals via an antenna 66 mounted to a conduit. For example, the antenna 66 may be mounted to the conduit via a mechanical connection (e.g., fastener, mating geometry, heat wrap, shrink wrap), an adhesive, epoxy, resin, tape, or any combination thereof. The mounted antenna 66 may extend along a portion of the conduit, at least partially about a circumference of the conduit, or any combination thereof. For example, the antenna 66 may be at least partially wrapped around the conduit. That is, the antenna 66 may circumferentially encompass at least a portion of the conduit, such that the antenna 66 extends circumferentially approximately 45, 60, 90, 120, 150, 180, 270, or 360 degrees about the conduit. The antenna 66 is electrically coupled to the communications circuitry 46 via a communications line 68. The antenna 66 may be arranged at least partially about a shielded conduit or an unshielded conduit. The antenna 66 may transmit and/or receive wireless signals through the free space (e.g., air) about the welding system 10. The antenna 66 is not electrically coupled with the conduit to which the antenna 66 is mounted. That is, the antenna 66 does not transmit or receive signals along an electrical cable (e.g., weld cable 54, work cable 24) of the conduit. In some embodiments, a first antenna 70 coupled to the welding power unit 12 may enable a first communications circuit 72 to communicate with a second communications circuit 74 via a second antenna 76 even in the occurrence of an obstructed line-of-sight between the first communications circuit 72 and the second communications circuit 74. That is, the first antenna 70 and the second antenna 76 may be arranged along respective conduits to enable a substantially unobstructed line-of-sight between the antennas 70, 76.

Figure 2:
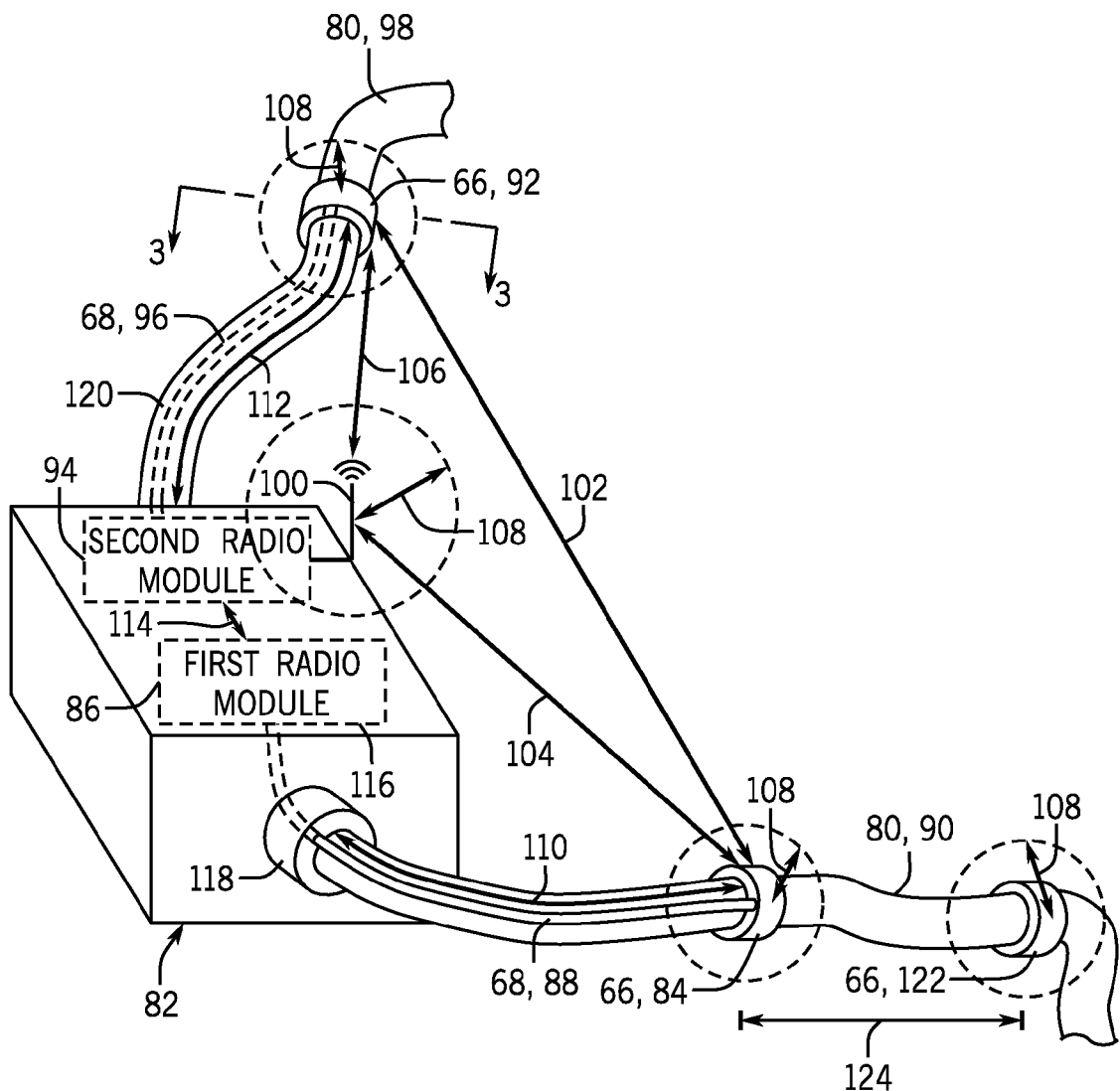
FIG. 2 illustrates an embodiment of annular antennas about conduits coupled to an enclosure of the welding system.

FIG. 2 illustrates an embodiment of antennas 66 coupled to conduits 80 that interface (i.e., couple) with an enclosure 82. The enclosure 82 may be the first enclosure 58 of the welding power unit 12, the second enclosure 62 of the welding device 14, and/or the third enclosure 64 of the gas supply system 16. The conduits 80 may be conduits conveying one or more electrical signals (e.g., communications, power), such as a input power cable 60, a weld cable 54, a work cable 24, a communications line, a cable bundle 20, or a cable bundle 38, and/or flows of gas, such as a gas supply line 34. The conduits 80 may be rigid or flexible conduits. The conduits 80 may interface with one or more components within the enclosure 82, including, but not limited to, the power conversion circuitry 28, the communications circuitry 46, the gas control system 36, the wire feed assembly 50, or any combination thereof.

A first antenna 84 is electrically coupled to a first radio module 86 via a first communications line 88. The first antenna 84 is disposed at least partially about a first conduit 90. A second antenna 92 is electrically coupled to a second radio module 94 via a second communications line 96. The second antenna 92 is disposed at least partially about a second conduit 98. In some embodiments, the first antenna 84 and/or the second antenna 92 is configured to substantially encircle the respective conduits 90, 98. The first radio module 86 and the second radio module 94 may be components of the communications circuitry 46 of the welding power unit 12, the welding device 14, the gas supply system 16, or the torch 18. In some embodiments, a fixed antenna 100 (e.g., whip antenna, dipole, rubber ducky antenna) may be mounted to the enclosure 82 and electrically coupled to the communications circuitry 46 within the enclosure 82. Additionally, or in the alternative, the fixed antenna 100 may be disposed within the enclosure 82 and coupled to the second radio module 94. For example, the enclosure 82 may be at least partially formed from a material (e.g., plastic) that enables wireless communications via the antenna 100 through the enclosure 82.

The first antenna 84 may be positioned about the first conduit 90 at a first distance 102 from the second antenna 92 and/or a second distance 104 from the fixed antenna 100. The second antenna 92 is positioned about the second conduit 98 at a third distance 106 from the fixed antenna 100. As may be appreciated, regulations on electromagnetic radiation emissions may specify a minimum distance 108 between two or more antennas without certification of regulatory compliance. For example, regulations may specify that the minimum distance 108 between two antennas is to be greater than approximately 5, 10, 15, 20, 30, or 50 cm. Accordingly, a first length 110 of the first communications line 88 may enable the arrangement of the first antenna 84 about the first conduit 90 to be regulation-compliant with respect to the first distance 102 relative to the second antenna 92. Additionally, or in the alternative, the first length 110 of the first communications line 88 may enable the arrangement of the first antenna 84 to be regulation-compliant with respect to the second distance 104 relative to the fixed antenna 100.

In a similar manner, a second length 112 of the second communications line 96 may enable the arrangement of the second antenna 92 about the second conduit 98 to be regulation-compliant with respect to the third distance 106 relative to the fixed antenna 100. As may be appreciated, the flexible first conduit 90 and first communications line 88 may enable the manufacturer and/or the operator to adjust the first and/or second distances 102, 104 to be greater than the minimum distance 108 to comply with electromagnetic interference regulations. The arrangement of the first antenna 84 about the first conduit 90 may enable the first radio module 86 and the second radio module 94 to be spaced a fourth distance 114 apart within the enclosure 82, where the fourth distance 114 is less than the minimum distance 108. Accordingly, the first antenna 84 arranged about the first conduit 90 enables the enclosure 82 about the first and second radio modules 86, 94 to be smaller than if both the first and second radio modules 86, 94 utilized fixed antennas 100 that interface with the enclosure 82 or are arranged within the enclosure 82. That is, whereas fixed antennas 100 coupled to the first and second radio modules 86, 94 may have an enclosure 82 with a dimension (e.g., length, width, height) greater than the minimum distance 108, the antennas 66 described herein enable the enclosure 82 to have each dimension less than the minimum distance 108.

The communications line 68 coupled to the antenna 66 may include, but is not limited to, a coaxial cable, a twisted pair, or a shielded cable. The communications line 68 may be separate from the conduit 80, as illustrated by the first communications line 88 between the first antenna 84 and the first radio module 86 separate from the first conduit 90. In some embodiments, the first communications line 88 extends through the enclosure 82 to directly couple with the first radio module 86, thereby directly coupling the first antenna 84 to the first radio module 86. Alternatively, the first communications line 88 couples with the first radio module 86 via a communications port 116. The communications port 116 illustrated in FIG. 2 is integrated with a first terminal 118 that interfaces with the first conduit 90; however in some embodiments, the communications port 116 may be separate from the first terminal 118 that interfaces with the first conduit 90. The communications port 116 may enable the first antenna 84 and first communications line 88 to be attached (e.g., retrofit) to an existing first conduit 90 (e.g., weld cable 54).

In some embodiments, the communications line 68 is at least partially integrated with the conduit 80, as illustrated in by the second communications line 96 between the second antenna 92 and the second radio module 94. For example, the second communications line 96 may be integrated with a weld cable 54 such that the second communications line 96 is within a sleeve 120 (e.g., an insulation layer, a shielding layer) of the second conduit 98. The sleeve 120 may partially or completely enclose (e.g., encompass) an external portion (e.g., second length 112) of the second communications line 96 between the enclosure 82 and the second antenna 92. In some embodiments, the sleeve 120 is integrally formed with the second antenna 92. Additionally, or in the alternative, the sleeve 120 may be integrally formed with the second conduit 98 (e.g., weld cable 54, work cable 24, cable bundle 20, cable bundle 38, and so forth). The sleeve 120 may enable the second conduit 98 and the second antenna 92 to be less may likely to snag or catch on cables, corners, hooks, and other items when moving the second conduit 98 about a worksite. In some embodiments, the sleeve 120 and the second antenna 92 are integrally formed with or retrofit about the second conduit 98 such that coupling the second conduit 98 to a respective second terminal 118 of the enclosure 82 electrically couples the second conduit 98 to a component within the enclosure and electrically couples the second antenna 92 to the second radio module 94 via a respective communications port 116 discussed above. The sleeve 120 may include, but is not limited to a wrap or tape that secures the second communications line 96 to the second conduit 98.

In some embodiments, multiple antennas 66 may be arranged along a conduit 80. For example, a third antenna 122 may be positioned on the first conduit 90, where the third antenna 122 is electrically coupled to the second radio module 94 or the communications circuitry 46 of another component (e.g., welding power unit 12, welding device 14, gas supply system 16, torch 18) of the welding system 10. The third antenna 122 is spaced a fifth distance 124 from the first antenna 84, where the fifth distance 124 is greater than the minimum distance 108. For example, the first antenna 84 may be arranged about a weld cable 54 and coupled to communications circuitry 46 within a welding wire feeder. The third antenna 122 may be arranged about the weld cable 54 and coupled to communications circuitry 46 within a torch 18 or other component of the welding system 10. It may be appreciated that any quantity of antennas 66 may be coupled to respective radio modules within the enclosure 82. For example, the welding system 10 may have an enclosure 82 that communicates with 1, 2, 3, 4, 5, 6, 7, 8, 9, 10 or more antennas 66 and having respective radio modules, where each antenna 66 is arranged at least partially about respective conduits 80 and spaced at least the minimum distance 108 from other antennas 66 or fixed antennas 106.

Figure 3:
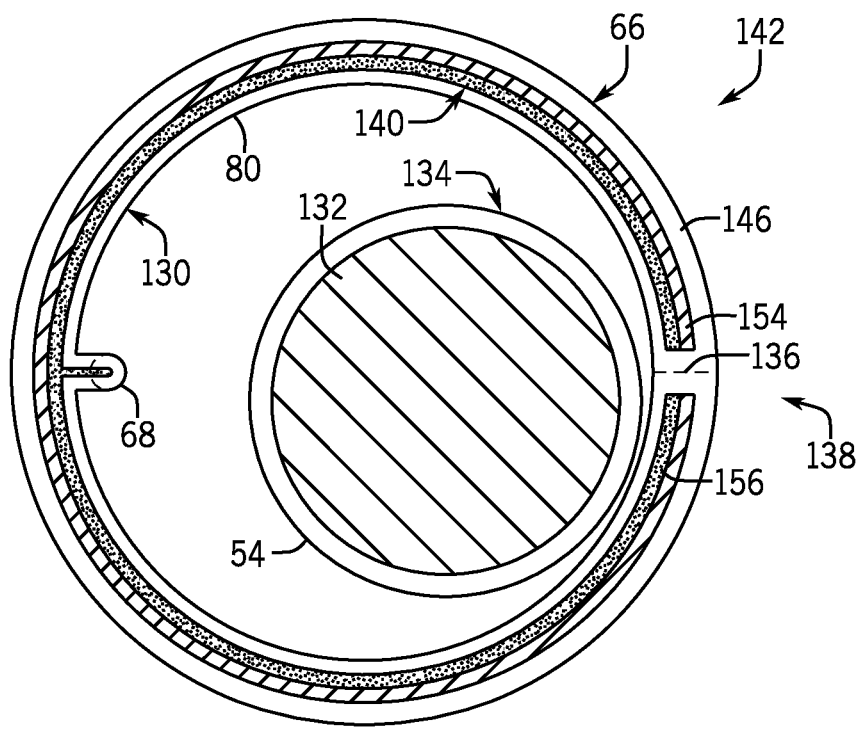
FIG. 3 illustrates a cross section of an embodiment of an annular antenna of FIG. 2, taken along line 3-3.

FIG. 3 illustrates a cross sectional view of an embodiment of the antenna 66 arranged (e.g., mounted) about the conduit 80, taken along line 3-3 of FIG. 2. The weld cable 54 is arranged within the conduit 80, and the communications line 68 couples with the antenna 66 through a wall 130 of the conduit 80. In some embodiments, air and/or insulation may fill the space between the wall 130, the weld cable 54, and the communications line 68. Additionally, or in the alternative, the communications line 68 may be coupled to the wall 130 of the weld cable 54 without an intervening space. The weld cable 54 may be a solid or braided conductor 132 within an insulating layer 134. The antenna 66 is disposed about the conduit 80 about the wall 130 of the conduit 80. In some embodiments, the antenna 66 is annular about the conduit 80. The antenna 66 may be a split ring as shown by the dashed line 136, thereby enabling the antenna 66 to be disposed about the conduit 80 from a radial direction 138. For example, a split-ring antenna 66 may be attached from the radial direction 138 to a conduit 80 (e.g., weld cable 54) that is coupled to a component (e.g., welding power unit 12) of the welding system 10 without uncoupling the conduit 80 from respective component, thereby enabling the split ring antenna 66 to be readily coupled to the conduit 80.

The communications line 68 couples to an antenna element 140 of the antenna 66, which receives or transmits electromagnetic signals through the environment 142 about the antenna 66. The antenna element 140 is an electrically conductive material (e.g., aluminum, copper, silver). The antenna element 140 may be coupled to a flexible medium 144, such as a flexible printed circuit board, adjacent the antenna element 140. In some embodiments, the antenna element 140 is a foil. Additionally, or in the alternative, the antenna element 140 may be formed (e.g., etched, deposited) on a flexible substrate, such as a polyimide, polyether ether ketone (PEEK), or transparent conductive polyester film, or any combination thereof. The antenna element 140 and the flexible medium 144 may be layered and/or encapsulated with an insulating and/or protective material 146.

Figure 4:
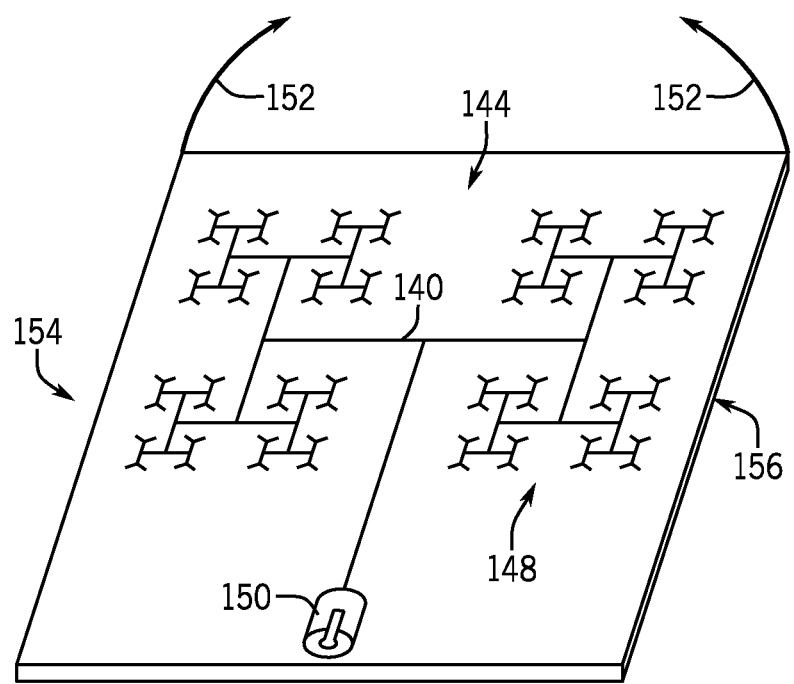
FIG. 4 illustrates a perspective view of an embodiment of an antenna that may be arranged about a conduit of a welding system.

FIG. 4 illustrates an embodiment of the antenna 66 to be arranged about a conduit 80. The antenna element 140 may be arranged in various patterns on the flexible medium 144 based at least in part on the wavelength and characteristics of the wireless transmission to be communicated via the antenna 66. FIG. 4 illustrates the antenna element 140 arranged in a branching pattern 148. Presently contemplated arrangements of the antenna element 140 may include, but are not limited to, spiral patterns, circular patterns, square patterns, or rectangular patterns, or any combination thereof. A connector 150 on the flexible medium 144 is configured to electrically couple the antenna element 140 to the communications line 68 (e.g., coaxial cable, in certain embodiments). The flexible medium 144 enables the antenna 66 to be shaped about the conduit 80 as shown by arrows 152, such that a first edge 154 may be adjacent to an opposing edge 156 of the flexible medium 144 when the antenna 66 is disposed about the conduit 80, as illustrated in FIG. 3.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
an enclosure having a first radio module disposed therein;
a first cable coupled to the enclosure;
a first antenna electrically coupled to the first radio module and mounted to the first cable at a first location along the first cable outside the enclosure, wherein the first radio module is configured to communicate along a first wireless communications channel via the first antenna; and
a second antenna electrically coupled to a second radio module, wherein the second radio module is configured to communicate along a second wireless communication channel via the second antenna and the second radio module is disposed within the enclosure.

2. The system of claim 1, wherein the first wireless communications channel comprises a Wi-Fi channel, a cellular channel, a Bluetooth channel, a Zigbee channel, or any combination thereof.

3. The system of claim 1, wherein the enclosure encompasses a welding wire feeder, and the first cable comprises a weld cable.

4. The system of claim 1, wherein the enclosure encompasses a welding torch, a remote welding controller, a welding sensor, or any combination thereof.

5. The system of claim 1, wherein the first antenna comprises a flexible circuit board mounted to the first cable.

6. The system of claim 1, wherein the first antenna is disposed at least partially about the first cable.

7. The system of claim 1, comprising:
a communication line coupled to the first radio module and to the first antenna; and
a sleeve disposed about the communication line and an external portion of the first cable, wherein the external portion of the first cable is outside the enclosure between the enclosure and the first location.

8. The system of claim 1, wherein the second radio module is disposed less than 20 cm from the first radio module, and the first location of the first antenna is spaced a distance greater than 20 cm from a second location of the second antenna.

9. The system of claim 8, comprising a second cable coupled to the enclosure, wherein the second antenna is mounted to the second cable at a second location along the second cable outside the enclosure.

10. The system of claim 8, wherein the second location of the second antenna is within the enclosure.

11. A welding system comprising:
a first antenna configured to be mounted to a first cable that interfaces with an enclosure of the welding system, wherein the first antenna is configured to communicate along a first wireless communications channel;
a first communication line electrically coupled to the first antenna, wherein the first communication line is configured to electrically couple the first antenna to a first radio module disposed within the enclosure;
a second antenna configured to be mounted to a second cable that interfaces with the enclosure of the welding system, wherein the second antenna is configured to communicate along a second wireless communications channel; and
a second communication line electrically coupled to the second antenna, wherein the second communication line is configured to electrically couple the second antenna to a second radio module disposed within the enclosure.

12. The welding system of claim 11, wherein the first communication line comprises a coaxial cable.

13. The welding system of claim 11, wherein the first antenna comprises a sleeve at least partially disposed about the first cable.

14. The welding system of claim 11, wherein the first antenna comprises a printed circuit.

15. The welding system of claim 11, wherein the first antenna and the second antenna are mounted outside the enclosure.

16. The welding system of claim 11, comprising:
the enclosure;
the first radio module; and
the second radio module disposed less than 20 cm from the first radio module, wherein the first antenna is disposed a distance greater than 20 cm from the second antenna.

17. A welding system comprising:
a weld cable configured to provide weld power to a torch, wherein the weld cable comprises a first terminal configured to interface with an enclosure;
a first antenna mounted to the weld cable, wherein the first antenna is configured to receive or transmit a first radio signal;
a first communication line comprising a first end and a second end, wherein the first end is configured to electrically couple with the first antenna, and the second end is configured to electrically couple with a first radio module disposed within the enclosure;
a second antenna mounted to a cable, wherein the second antenna is configured to receive or transmit a second radio signal; and
a second communication line configured to electrically couple the second antenna with a second radio module.

18. The welding system of claim 17, comprising the enclosure, wherein the enclosure encompasses a welding wire feeder, a welding power source, a pendant, a welding torch, or any combination thereof.

19. The welding system of claim 17, wherein the first communication line is configured to be at least partially integrated with the weld cable outside of the enclosure.

20. The welding system of claim 17, wherein the first antenna is disposed at least partially about the weld cable and wherein the first antenna is mounted to the weld cable outside of the enclosure.

* * * * *